March 3, 1970  W. SHULVER  3,498,038
TENSILE MEMBERS, APPARATUS AND METHOD FOR PRODUCTION
Filed July 11, 1966  3 Sheets-Sheet 1

THE PROBLEM
Fig. 1

Fig. 2

INVENTOR.
WILLIAM SHULVER
BY
*Staelin & Overman*
ATTORNEYS

United States Patent Office 3,498,038
Patented Mar. 3, 1970

3,498,038
TENSILE MEMBERS, APPARATUS AND METHOD FOR PRODUCTION
William Shulver, Saylesville, R.I., assignor to Owens-Corning Fiberglas Corporation, a corporation of Delaware
Continuation-in-part of application Ser. No. 439,907, Mar. 15, 1965. This application July 11, 1966, Ser. No. 564,092
Int. Cl. D04d 7/04; D02g 3/40, 3/18
U.S. Cl. 57—7          14 Claims

ABSTRACT OF THE DISCLOSURE

Elongated, line-type tensile members are provided, made up of plural strands of no yield material, e.g., glass, supported in a matrix, with a helical overwrap, in equally load bearing relation; apparatus and method are also provided for making the tensile members by orienting and compacting plural strands into a bonding matrix.

---

This is a continuation-in-part of copending application Ser. No. 439,907, filed Mar. 15, 1969 now abandoned.

This invention relates to composite tensile members, apparatus and methods for production.

More particularly, this invention relates to composite tensile members comprising a plurality of specifically oriented line-type tensile elements embedded in a hardened encapsulating matrix.

Still further, this invention relates to a method of producing composite tensile members wherein a plurality of line-type tensile elements are oriented so that all are made substantially equally load bearing.

Still further, this invention relates to apparatus for producing novel tensile members.

In a still further aspect, this invention relates to cable-type tensile members having two distinct breaking levels, whereby a warning signal is produced by the breaking of one of the component parts of the tensile member at a first load level, below the maximum load-bearing capabilities of the member.

PRELIMINARY DISCUSSION OF THE PROBLEM

Glass fibers are characterized by an extremely high modulus, but do not have a yield point like steel does. Heretofore, glass fibers have not been used to the highest degree of efficiency in load-bearing tensile members such as cables due to the fact that the unique combination of properties of the fibers has not been fully understood.

As distinguished from the relatively small use of glass fibers in tensile members of the prior art, steel has enjoyed widespread use in cables and the like, with a high degree of success, even though it has substantially lower tensile strength than does glass in fiber form. This is due to the fact that steel has a substantial elongation after yield and, thus, as a steel cable stretches, all of the wires or fiber elements making up the cable assume the total load, even though such elements initially be of slightly differing lengths so that the shorter ones take up the load first. Those steel elements that reach the yield point first, continue to remain load-bearing by elongation as the other, longer elements, take up their portion of the load.

By distinction, glass has no yield point. Thus, in a composite tensile member comprised of glass fibers of differing lengths, the shorter fibers pick up the load first and break when their limit is reached. The longer fibers in the composite tensile member, therefore, are useless.

Thus, in prior art tensile members made of glass fibers, only a portion of the fibers have heretofore been utilized. Therefore, the practitioners of the prior art have made glass-containing tensile members substantially oversize in order to provide assurance that enough fibers of the same length are present to support the designed load. This means that a substantial number of longer, nonload-bearing fibers are present which add to the bulk of the product but are substantially nonfunctional.

From the foregoing, it will be evident that a substantial contribution would be provided to the art by composite, line-type tensile members, particularly when comprised of high modulus line-type tensile elements having no yield, but wherein all elements are rendered substantially equally load bearing.

A further contribution to the art would be provided by apparatus and method for producing such "oriented" tensile members.

It is, therefore, an important object of the invention to provide novel composite tensile members having unexpectedly high strength and very low weight wherein all of the composite elements are present in equal load-bearing orientation.

A further object is to provide novel glass fiber reinforced plastic tensile members having a strength-to-weight ratio from about 5 to 10 times higher than steel.

A still further object is to provide novel apparatus for producing the novel tensile members of the present invention.

A still further object is to provide a novel method for producing the novel tensile members of the present invention.

Another object is to provide novel tensile members having components that break at distinctly different levels to provide a telemetering system in the form of a unitary tensile member.

Other objects of this invention will appear in the following description and appended claims, reference being had to the accompanying drawings forming a part of this specification wherein like reference characters designate corresponding parts in the several views.

FIGURE 9 is a perspective view, partly broken away, of a practical application of the present invention; and, FIGURE 10 is a fragmentary perspective view, partly in section, of another practical application of the present invention.

THE PROBLEM SOLVED BY THE INVENTION

Figure 1:
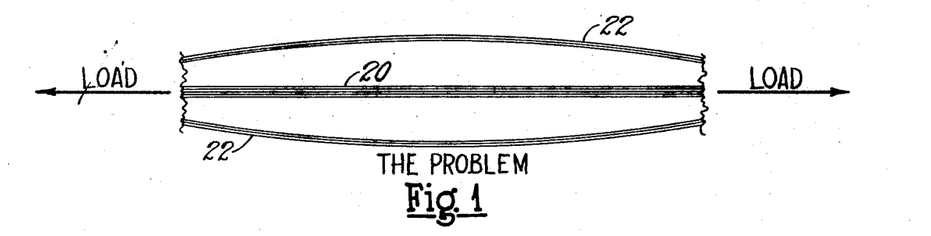
FIGURE 1 is a schematic view illustrating the problem solved by the present invention.
Figure 2:
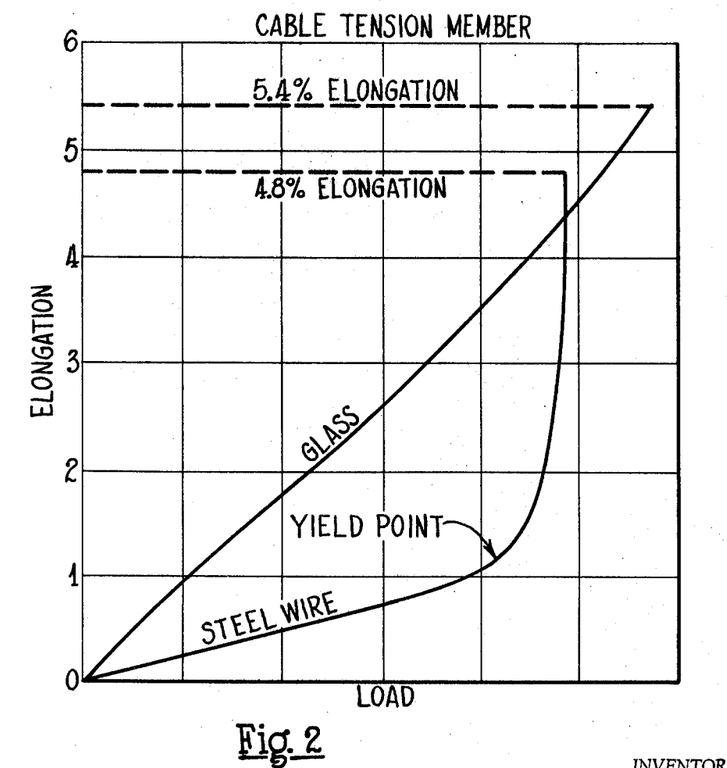
FIGURE 2 is a graph comparing the elongation and yield curves of steel and glass to further highlight the problem solved by the present invention.

This is illustrated in FIGURES 1 and 2 of the drawings. For simplicity of illustration, only a few fibers are shown in FIGURE 1. The central fibers 20 are straight and thus shorter than the outer fibers 22.

In the case of glass fibers, the fibers 20 assume all the load and break before the fibers 22 assume any load. As discussed above, there is no yield point to the glass fibers 20 and thus, when they break, a cable made of them will fail at this point. The outer fibers 22 are useless and, therefore, the high tensile strength of the fibers 22 is not utilized.

With steel, as shown in FIGURE 2, the situation is different because, when steel fibers 20 reach the yield point, they give and elongate. The elongation of the steel fibers 20 permits steel fibers 22 to become load-bearing also. There is no fracture of the fibers 20, in the case of steel, and thus the entire mass assumes the loading.

Once a steel cable has become "conditioned," substantially all of the fibers making up the cable will be load-bearing.

It would be understood, however, that glass fibers cannot reach such a "conditioned" state. If glass fibers are ever to reach a "conditioned" state, they must be put into that state when the cable is made and must be in that state in the static condition of the cable.

In FIGURE 2, the comparison between glass and steel is further illustrated. Note that the steel wire has a yield point at about 1% elongation. The steel remains load-bearing to the point of break at 4.8% elongation. Glass, on the other hand, has no yield but reaches the break point directly at the maximum elongation of 5.4%, without ever going through a yield point.

In view of the foregoing discussion, it will be evident from the following description, that a substantial advance has been provided by unique tensile members in which a plurality of line-type tensile elements are "oriented" to be rendered substantially equally load-bearing and are compacted into a bonding matrix by novel apparatus and process.

THE HIGH TENSILE EMBODIMENT

Figures 3, 4, 5, 5A, 6:
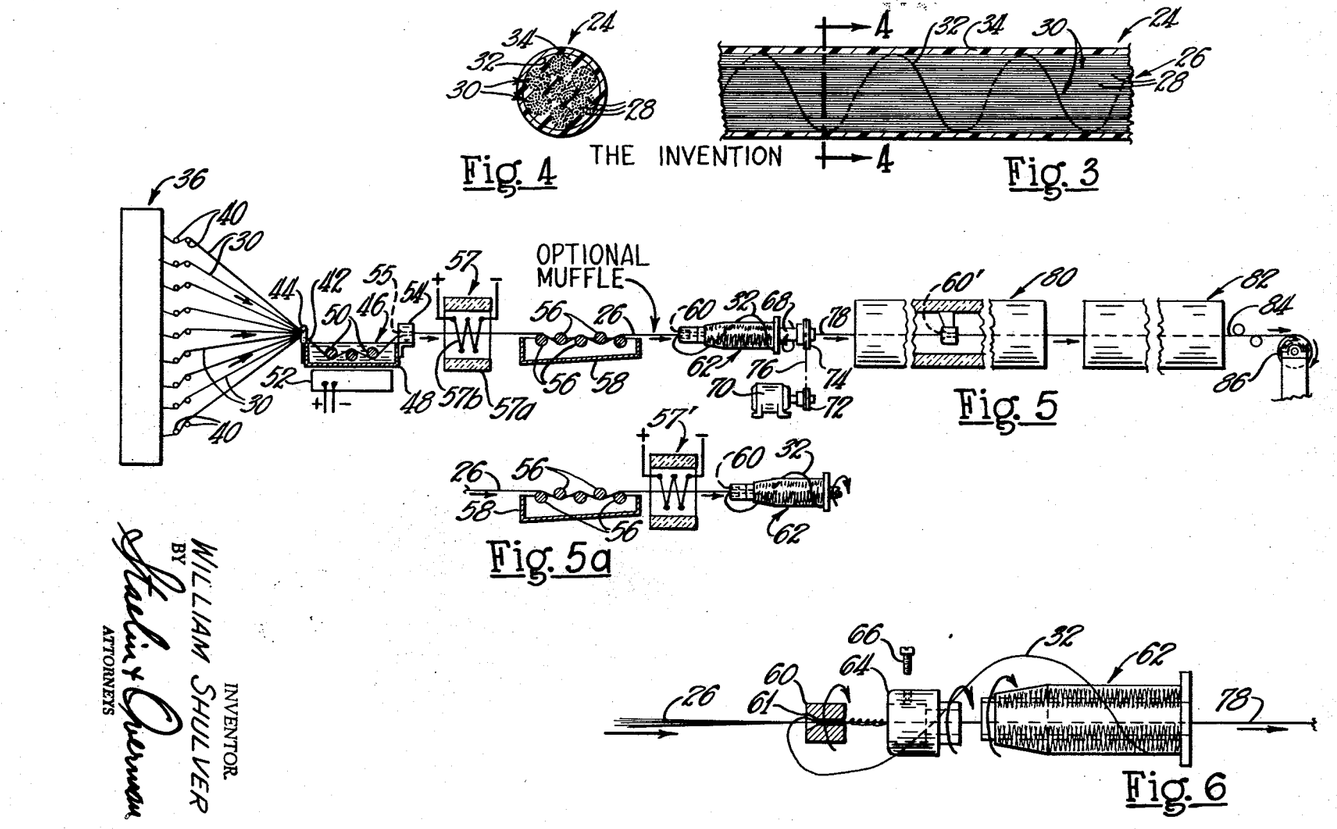
FIGURE 3 is an elevational view, partly in section, of a tensile member of the present invention.
FIGURE 4 is a sectional view taken along the line 4—4 of FIGURE 3.
FIGURE 5 is a schematic, side-elevational view of apparatus for manufacturing the novel tensile members of the present invention.
FIGURE 5a is a fragmentary view showing how an optional muffle furnace can be utilized in the apparatus of FIGURE 5.
FIGURE 6 is an enlarged, exploded, fragmentary, elevational view, partly in section, of a component of FIGURE 5 to better illustrate the invention.

One preferred embodiment of the invention is shown in FIGURES 3 and 4 of the drawings. This embodiment is designed to support maximum load without incurring any individual fiber breakage. Thus, in this embodiment, substantially all fibers are "pre-conditioned" or "oriented" and thereby assume the total load simultaneously.

In the present embodiment, each tensile member 24 includes a core section 26. Core 26 comprises a plurality of strands 30, made up of continuous glass fibers 28, or analogous lineal elements. All of the strands 30 are oriented to be of equal length and are compacted together in close side-by-side relationship.

In this embodiment of the invention, the individual fibers 28 were derived from strands 30, as known in the glass fiber trade. These are formed by pulling a plurality, for example 150 or more, of individual glass fibers 28 from a glass melting bushing. The bushing has a plurality of feed orifices, corresponding to the number of fibers pulled. By this continuous method of operation, the fibers 28 are drawn out to infinite length and are, therefore, known as continuous fibers. The fibers are so fine, that is of such small diameter, that they are designated in terms of thousands of yards per pound. The continuous fibers 28 are gathered together into a strand by being directed over a gathering shoe and are held together by a binder applied at the shoe to keep the strand coherent. As the fibers 28 are formed, they are placed under the same constant tension, depending on draw rate viscosity of the molten glass from which formed, and other factors. The result is a strand of fibers, wherein all of the component fibers are parallel to one another. These have no twist.

From the foregoing description it will be understood that within the starnds 30, there is no particular problem of equal load-bearing orientation as between the individual fibers 28, because of the method of manufacture. However, the present invention is concerned with the orientation of several strands 30 relative to one another in a composite tensile member. This amounts to more than the simple drawing out type of alignment referred to above in the manufacture of strands of continuous fibers.

In the usual processing operation to prepare these glass strands for the textile trade, they are subsequently paid off the forming package and provided with twists of one or more turns per inch while being formed into a serving package. It is the strands on the serving package that have been used in this specific embodiment of the invention. However, the broad scope of the invention would include the use of strands taken directly from the forming package and thus having zero twist. In an actual embodiment of the invention, strands 30 having one turn per inch were used.

In order to hold the strands 30 in equal length orientation and compacted relation to one another, a helical overwrap strand 32 is applied. This is put around the core 26 after the substantially straight line oriented strands 30 have been impregnated with a matrix resin and shaped carefully to produce a mass of desired section and having a controlled content of resin. This is effected, as described hereinafter, by passing the impregnated strands 30 through a first circular die of a specific diameter while the strands are all under a carefully controlled tension.

Application of the helical overwrap strand 32 is made after the substantially straight line oriented strands 30 have passed through the first die so that the compacted and oriented condition of the strands is permanently preserved after having been established by the first die.

It will be noted that an outer, thin covering of the matrix resin 34 is provided. This is carefully controlled in thickness by passing the overwrapped core through a second die of specific diameter. The resin coating 34 protects the surface fibers of the finished cable against abrasion and against weathering. Note also in FIGURE 4 that the matrix resin 34 saturates the entire composite member 24.

SPECIFIC EXAMPLE I

A tensile member was actually made using 22 strands each comprising a plurality of continuous fibers of high-strength glass of a fiber diameter measured as 15,000 yards per pound. Each strand 30 had one turn per inch of twist and contained a resin-compatible binder.

One end or strand was used as the helical overwrap 32.

Ciba 6005 epoxy resin was used as the matrix, using boron trifluoride monoethylamine complex as the curing agent. This is a standard Ciba epoxy resin formulation having a viscosity, cps., at 25° C. of 5000–6400.

The tensile member so prepared withstood a dead load of 284 pounds at break. This extrapolates to 278,800 pounds per square inch for the composite and 594,800 pounds per square inch for the glass. The outstanding tensile values are produced by the equal length of all fibers which causes them to share the load equally. Thus, maximum utility is obtained from substantially all of the glass content.

The diameter of this unit was .036 inch and the ignition loss was 27.4%.

The density of tensile members made in accordance with this example is about 1.7. On a strength-to-weight ratio, these tensile members are about five times as strong as the finest piano wire, in air. Piano wire has a density of about 7.

By contrast, and due to the lower specific gravity and very high tensile strength, a cable of the present invention will support itself at 120,000 feet on a conservative basis.

In water the results are even better. Water tends to float the tensile members of the present invention due to their low density and on this basis they are about ten times stronger than piano wire on a strength-to-weight ratio. In water the effective density is reduced to about 1.0, whereas in water, the effective density of piano wire is reduced from about 7.0 in air to about 6.0 in water.

It is to be pointed out that the matrix resin 34 helps the fibers to share the load. Thus, it is a definite and component part of the present invention. The matrix 34 tends to distribute the load from one fiber 28 to an adjacent fiber.

In the foregoing example, it is to be reiterated that all strands were of substantially straight line orientation, as in FIGURES 3 and 4. However, the individual strands within the tensile member 24 had one twist or turn per lineal inch. Thus, the fibers were not truly straight line.

SPECIFIC EXAMPLE II

A tensile member was made using twelve strands, each comprising a plurality of continuous glas fibers of S glass of a fiber diameter of 15,000 yards per pound. Each strand had one turn per inch and contained a resin-compatible binder. One strand of like kind was used as the helical overwrap.

Ciba 6006 epoxy resin with boron trifluoride monoethylamine complex as the curing agent, was used as the matrix.

The first oven temperature was 500° F. and the second was 600° F. The final die had a nominal opening of .024–.025 inch. A processing speed of 50 lineal feet per minute was employed. The resin temperature in the dip bath was 115° F.

The tensile member withstood a dead load of 141 pounds at break, which is 11.8 pounds per strand. This extrapolates to 228,000 pounds per square inch for the composite. The elongation at break was 4.35%. The average diameter of the composite tensile member was .028 inch and the weight was 0.41 pound per thousand feet. The ignition loss was 24.1%.

SPECIFIC EXAMPLE III

This example illustrates higher processing speeds obtainable by the invention. A tensile member was made by using 22 strands of E glass of a fiber diameter of 15,000 yards per pound. Each strand had one turn per inch and contained a resin-compatible binder.

Ciba 6005 epoxy resin with boron trifluoride monoethylamine completx as the curing agent, was used as the matrix. The resin was raised to above 180° F. by the muffle furnace between the resin bath and the manipulation bars.

The first and second oven temperatures were 600° F. The first die had a hole diameter of .032 inch and the second die had a hole diameter of .035 inch. The composite tensile member had an average diameted of .036 inch.

Processing speed was 200 feet per minute.

The tensile member withstood a dead load of 176 pounds and had an elongation of 4.5% at break. The ignition was 27.4% and the weight was .067 pound per thousand feet.

Within the extended scope of the present invention, substantially any glass and substantially any compatible resin can be used to make the novel tensile members. Also, it may be possible to include other hardenable matrix materials such as low-melting alloys, for conductor use, etc. as discussed later.

The broad range of the components will fall within the limits of about 90% to about 25% glass and from about 10% to about 75% by weight of resin.

Within the scope of the invention, from zero up to about ten turns per inch can be utilized for the strands.

THE APPARATUS: EMBODIMENT 1; FIGURES 5 AND 6

In the following description, the points listed below will be covered in detail:

(A) Orienting a plurality of fibers to equal length as by light pulling force, to render them equally load-bearing, and gathering them together into a roving as a core;

(B) Impregnating the gathered core roving with a hardenable matrix material;

(C) Removing excess liquid matrix by means of a first die;

(D) Applying a spiral overwrap;

(E) Passing the overwrapped core through a second die to establish final shape; and, (F) Hardening the matrix to "fix" the shape and content of the composite tensile member.

As shown in FIGURE 5, a creel 36 is employed to hold a plurality of serving packages, not shown. In accordance with the example previously described, 22 serving packages would have been employed to provide 22 strands 30. Each strand 30 is provided with the same light tension. For such purpose, tension devices 40 are utilized.

Next, the strands 30 are converged together in substantially straight line, side-by-side relation into a roving 42 by means of a gathering ring 44. This is the core 26 in FIGURE 3. From the gathering ring 44, the roving 42 proceeds to a resin impregnating bath 46. As pointed out before, one suitable resin comprised an epoxy resin (Ciba No. 6005) using boron trifluoride monethylamine complex as a hardener. Within the scope of the invention, the resin impregnating bath 46 is to be constured broadly as encompassing a hardenable matrix. This is discussed further below.

The resin bath 46 is held in a container 48 having a plurality of dip rods 50 supported therein. The roving 42 is passed underneath at least one of the dip rods 50 and thus carried down into the bath 46 to be coated with the liquid resin. Plural dip rods 50 are preferably used, to work the roving 42 for improved wet out by the liquid resin 46 e.g., cause the resin to fully coat each roving 42 and remove air bubbles by thorough impregnation.

The resin bath 46 is suitably heated, and for such purpose, a hot plate 52 may be used. In one typical operating procedure, the resin bath is heated at a temperature in the range from 150–200° F. However, care must be exercised that excess heat is not applied at this point because the resin of bath 46 will gel and thicken by mass action.

DIE NO. 1

After being immersed in the resin bath 46, the impregrnated roving 42 proceeds through a first die 54. Die 54 has a tapered hole 55 as indicated in dotted outline. The hole 55 is of specific diameter relative to the roving 42. This means that different die hole sizes will be used for different roving sizes. As the resin containing roving 42 passes through the first die 54, excess resin is removed, thereby providing a controlled amount of resin on the roving.

From the first die 54, the roving 42 passes over a plurality of metal bars 56 or equivalent, supported above a drip pan 58. As the impregnated roving 42 passes between the metal bars 56, all strands and fibers therein are manipulated, causing them to become still more fully wetted out by the resin.

THE PREHEAT MUFFLE FOR IMPROVED RESIN WET OUT

In the early stages of this invention, it was observed in some instances that resin wet out by the bars 56 was not as thorough as desired. Thus, a muffle furnace 57 has been adopted, as illustrated in FIGURE 5, to heat the resin-impregnated core 26 prior to passage of the core through the manipulating bars 56. The muffle 57 is an electrical coil furnace. A refractory insulating material 57d of annular shape can be retained as an outside wall of the unit and an electrical coil 57b of annular configuration is positioned on the inside of the refractory wall.

The temperature of the muffle furnace 57 is correlated with the lineal feed rate of the core 26 so that appropriate heat input is provided to reduce the viscosity of the matrix resin for thorough wet out. In actual practice, 1000–1800° F. temperature levels have been utilized in the muffle to impart a temperature of about 180–200° F. to the matrix. Simultaneously, of course, the heat applied can be adjusted to initiate the cure of the resin for improved shaping and shape retention in the second die 60, to be described. The remainder of the processing takes place at a sufficiently high speed that the resin does not fully set until a certain point in the first funace 80. It was previously observed that, without the muffle furnace 57, larger diameter composite tensile members were provided with only a surface coating of the matrix resin. By this improved muffle arrangement, thorough impregnation, of even the heavier rodlets, is provided, and at improved processing speed through the system.

Thus, the present arrangement provides improved impregnation without application of excess heat to the resin bath 46.

The use of the muffle furnace 57 (heated zone), after the resin bath 46, and prior to the flex bars 56, solves the problem discussed above. While the elevated temperature with the zone (1000–1800° F.) initiates resin curing, it more importantly promotes molecular activity providing, for a short period, a resin of reduced viscosity. Because of the reduced viscosity, wet out improves so that improved impregnation of even larger bundles of strands occurs in an accelerated manner. Secondly, the improved impregnation is enhanced when the strands, having the reduced viscosity resin, are mechanically worked on the flex bars 56.

By the use of the heated zone, an increase in linear strand processing speeds has been made possible from about 50' to about 200' per minute with excellent impregnation. Also, a more uniformly round and smoother product has been produced.

At this point the roving 42 becomes an impregnated core 26. Next, the coated and manipulated core 26 passes through a second die 60. This is shown in FIGURE 6 and comprises an annular block of steel with a tapered hole 61 of specific diameter machined through it.

As shown in FIGURE 5a, a muffle furnace 57' can also be used between the manipulating bars 56 and the second die 60. By so operating, the matrix, in the case of a heat hardenable material, can be additionally heated in order to further enhance the hardening prior to entering the second die 60. This provides improved shape development and retention in the second die 60.

The second die 60 is supported in the end of a serving package 62. As shown in FIGURE 6, an annular die holder 64 is inserted into the end of the package 62, and a set screw 66 holds the die 60 in place.

The serving package 62 contains a quantity of continuous strand 32. The serving package 62 is mounted on a rotatable tube 68, FIGURE 5, supported by means of appropriate bearings. A motor 70 is supported in aligned relationship to the tube 68 and carries a drive pulley 72. The tube 68 carries a driven pulley 74. A belt 76 connects the pulleys 72 and 74 whereby the motor 70 rotates the shaft 68 and the serving package 62 as indicated by the arrow. The second die 60 rotates with the serving package 62.

As the coated and manipulated roving 26 proceeds through the rotating second die 60, a strand 32 from the serving package 62 is fed into the end of the second die. The rotation of the serving package 62 and the second die 60 causes the strand 32 to be laid on the advancing roving 26 in a spiral manner, that is as a spiral wrap. The spiral overwrap is designated 32 in FIGURE 3.

By adjusting the rate of rotation of the serving package 62 and thus the second die 60 to the lineal rate of travel of the manipulated roving 26, a selected number of overwrap turns per inch can be developed. In one specific embodiment, the overwrap turns are about ¼ inch apart, thus being laid on the core 26 at the rate of about 4 spiral turns per inch.

The number of spiral overwrap turns 32 that are laid on the core 26, per inch, is not believed to be critical in accordance with the present invention. Therefore, from about one to about ten spiral overwrap turns 32 can be utilized per lineal inch of the core 26.

However, it is to be understood that an optimum number of overwrap turns can be applied, depending on the diameter of the core 26.

THE FUNCTION OF THE OVERWRAP

The function of the overwrap strand 32 is to fix the equal length and compacted condition of the fibers 28 and the strands 30 making up the core 26.

Further, the overwrap strand 32 holds the completed tensile member emerging from the second die 60 to substantially the exact diameter produced by the second die and preserves the orientation of the strands 30.

The overwrap strand 32 is protected by a thin sheath of resin 34, FIGURES 3 and 4, pulled over it by the second die 60.

While circular dies have been described, it is to be understood that the extended scope of the invention would include the use of dies of other than circular configuration, such as ovals, multi-sided and the like.

CURING

After the composite tensile member 78 leaves the tube 68, it enters a first oven 80. Here, a pre-cure temperature of about 350° F. is maintained for an epoxy resin system. A residence time of about five to ten seconds is usually sufficient at this point in the process, where an epoxy resin is being cured.

In the second oven 82, the final cure temperature is established, for example about 600° F., for a generally similar residence time, in the case of the epoxy described in the examples provided above.

The temperatures and residence times given above are purely exemplary. In a particular application, the resin system, diameter of the composite tensile member, and other factors will be used to establish specific conditions of cure.

Within the scope of the invention, a third die 60' can be placed in the furnace 80 as shown in FIGURE 5. By so operating, final cross-sectional shaping of the composite tensile member can be effected during the actual final hardening stages of the matrix. The position of die 60' is critical in that the tensile member must pass through the die while the resin is still somewhat formable.

Also, one or both of the ovens 80 and 82 can be a dielectric furnace. By so operating, the cure of the matrix is finalized to the very center section more effectively, particularly in the case of heavier rodlets made by the invention. In view of the foregoing, the word "oven" as used herein can be construed to include a convection oven, a high-temperature muffle furnace or a dielectric oven.

PACKAGING

The cured composite tensile member 84 is wound onto a reel 86, rotatably driven by a suitable power means, not shown. The reel is periodically removed when full and another substituted to package the product for shipment.

THE APPARATUS: SECOND EMBODIMENT; FIGURES 7 AND 8

This embodiment of the invention is functionally the same as the embodiment of FIGURES 5 and 6. However, here a plurality of serving packages 62 are mounted so that their strands 30 are fed in a manner to provide the spiral overwrap configuration. A greater variety of overwrap configurations are possible by so operating.

Figure 7:
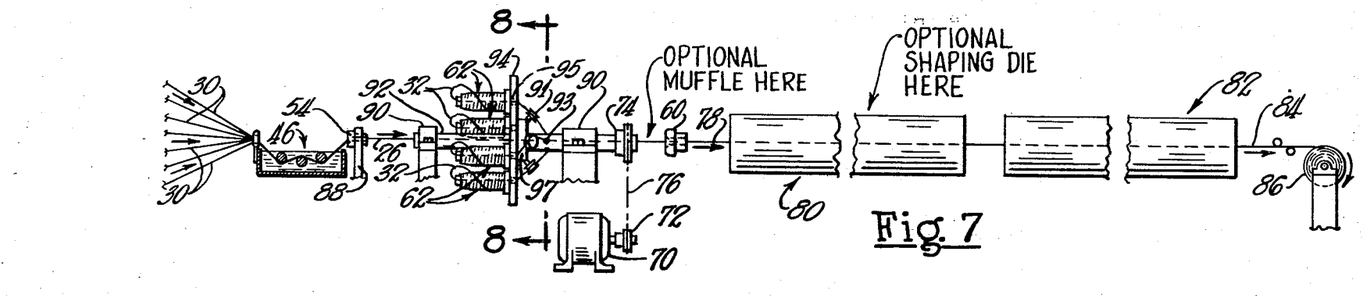
FIGURE 7 is a side-elevational view of another form of apparatus for manufacturing the novel tensile members of the present invention.

To more specifically describe this aspect of the invention, a creel, not shown, is provided to carry a plurality of serving packages, not shown, from which strands 30 are drawn. Tension devices 40 are utilized as discussed previously. It is to be pointed out that it is a very important aspect of the invention that all strands are drawn through the apparatus with equal force so as to be oriented to the same length.

The resin bath 46 is the same as used in FIGURE 5. The hot plate 52 is not here shown in order to avoid repetition.

The first die 54 is suitably mounted on a support member 88.

It is to be understood that it is within the scope of the invention to use the muffle 57 and manipulating bars 56 of FIGURE 5 between the die 54 and the support 90 for enhanced resin wet out.

Figure 8:
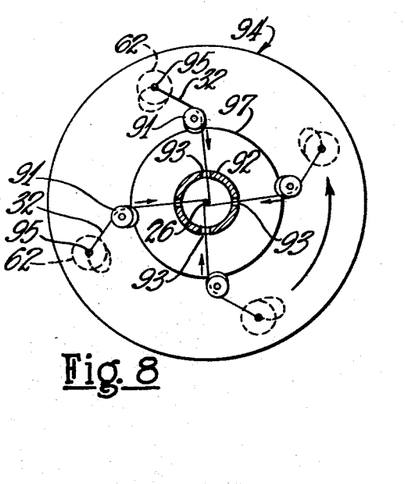
FIGURE 8 is an elevational view, partly in section, taken along the line 8—8 of FIGURE 7.

Support members 90 rotatably journal a tube 92, by means of appropriate bearings. Tube 92 carries a rotatable disc member 94 that incldes a hub 97 for attachment to the tube. Upon the disc member 94 are supported a plurality of serving packages 62 from which overwrap strands 32 are served. These overwrap strands 32 are reversed through each package 62 to facilitate removal, and passed through holes 95 in disc member 94. Then each strand 32 passes over a tension device 91 and then through holes 93 in tube 92 to be spirally wrapped on the core roving 26.

A motor 70, having a pulley 72, is operably connected with a driven pulley 74 by belt 76 to impart rotary motion to the carrier tube 92 and thus to disc member 94.

The several packages 62 are suitably held to the support 94 to permit the strands 32 to feed off in an operable manner and overwrap the roving 26 during its passage through the tube 92. The second die 60 is mounted in space so that final size is developed immediately following the application of the overwrap strands 32.

It is also to be understood that an optional muffle furnace can be used between the pulley 74 and the second die 60, to further enhance the setting of the matrix prior to entering the second die 60, for improved shaping therein.

The curing and packaging by means of ovens 80 and 82 and reel 86 are as described for the first embodiment.

GENERAL COMMENTS RELATING TO THE APPARATUS

It is to be understood that the ovens 80 and 82 and the muffles 57 and 57' serve to harden the matrix and "fix" the shape and content of the composite tensile member. Iin the extended scope of the invention, the ovens 80 and 82 can be replaced by cool body heat exchangers, as when molten metals and other heat-softenable matrix materials are used.

It is also to be understood that when a heat-softenable matrix material is employed, the muffles 57 and 57' of FIGURES 5 and 5a can be present in the form of heaters and/or coolers as necessary to facilitate wet out and preset of the liquid matrix.

The foregoing description has dealt particularly with glass fibers and epoxy resin matrix materials. The invention is believed to have broader scope, however, and thus the principles of orientation, compaction, embedding in a matrix, spiral overwrapping, sizing and fixing the shape and other features should be applicable to a broad range of fibers including those of many resins as well as metals. It, of course, will be evident that the invention is more particularly applicable to line-type tensile fibers having no yield, typified by glass. The broad range of matrix materials would include, in addition to resins, elastomers such as rubbers and plastisols, metals and others. The term matrix is, therefore, to be construed as encompassing both heat-hardenable and heat-softenable materials with appropriate heat exchange being provided.

The second die 60 in actual practice is maintained about .002 to .005 inch in diameter larger than the first die 54. This die makes the composite tensile member round, that is it re-shapes it, and provides the instrumentality by which the composite tensile member is preserved as regards the variable factors going into it. These include the proper compactness of the composite product and the equal length orientation of all fibers.

THE METHOD

In view of the foregoing description, it will be understood that the following method steps are inherent in the present invention:

*Step I.*—Multiple strands of fibers are pulled together into side-by-side relationship in a manner to be of equal length. This produces a multi-filament roving or core wherein each filament is oriented to the same load-bearing configuration, and the strands are of substantially straight line orientation.

*Step II.*—While in said oriented roving form, the roving is impregnated with a hardenable matrix material. This is suitably a thermosetting resin. However, the broad scope of the invention would include heat-softenable materials and other matrix materials as discussed above.

This step of the invention may include a manipulation of any suitable type to increase resin wet out on the fibers.

*Step III.*—Next, the impregnated roving, still having the fiber orientation retained therein, is shaped or developed to a specific size. This is effected by passing the roving through a suitable orifice which is effective to compact the fibers close to one another and remove excess resin. In short, the glass to resin ratio is here established and thus the physical constitution or make-up of the roving is developed.

This step will preferably include thermal and physical manipulation of the roving to cause substantially complete wet out of the fibers by the liquid matrix material.

*Step IV.*—This step of the process is highly important and can be defined as a "fixation" of the properties of the product.

To effect this step, the roving is provided with a helical overwrap. Either simultaneously or immediately after the overwrap is applied, the composite tensile member is passed through a second die or suitable orifice to provide the desired exact external profile.

In some operations, it may be desirable to put on the overwrap simultaneously with the passage of the composite tensile member through the second die as in FIGURE 5. In other operations, as in the embodiment shown in FIGURE 7, the final profile may be developed immediately following the application of the overwrap.

Also, prefixing of the matrix can be effected simultaneously.

This step is also effective to move some of the matrix material as a coating 34, FIGURES 3 and 4, over the helical overwrap and thereby protect the surface fibers against abrasion and against weathering.

*Step V.*—Thereafter, the matrix is hardened or fixed. In the case of a thermosetting resin, heat and/or a catalyst are used to effect the hardening. In the case of a heat-softenable matrix material, such as resin, bonding metal or other, it would be applied in molten form and then cooled to a solid state. Within the scope of the invention, the word "fix" means to solidify or stabilize the shape and other variable factors of the composite tensile member. Thus, "fix" can be construed as encompassing the setting of a thermosetting resin; thus, hardening a heat-hardenable matrix material. In this aspect, the heat exchange for fixation will be in the form of heat input to the matrix from a relatively hotter body.

Also, the word "fix" can be construed as solidifying a heat-softenable matrix material. This would imply that the matrix 46 in container 48 in FIGURES 5 and 7 would be a hot molten material, such as a metal, compatible of course with the strands 30, a high-melting wax, a thermoplastic resin such as polystyrene or the like. In this aspect, the heat exchange for fixation will be in the form of heat withdrawal from the matrix to a relatively cooler body. Thus, the ovens would be replaced by coolers.

*Step VI.*—The final step of the process comprises winding onto a reel or otherwise suitably packaging the product.

PRODUCT APPLICATIONS: TENSILE MEMBERS FOR CONDUCTORS; FIGURES 9 AND 10

Usually, a good electrical conductor has a relatively low tensile strength, copper and aluminum being typical examples. Particularly in telephone cables, the lead-coated conductors are so heavy that they are not self-supporting. Therefore, steel cables are usually employed to provide support, with the conductors being harnessed beneath the cables. Steel, of course, is very heavy. By the present invention, a reinforced conductor can be made considerably lighter in weight by a four-to-one advantage than a steel reinforced cable, because that is the ratio which the tensile members of the present invention have over steel on an equivalent weight basis.

Figures 9, 10:
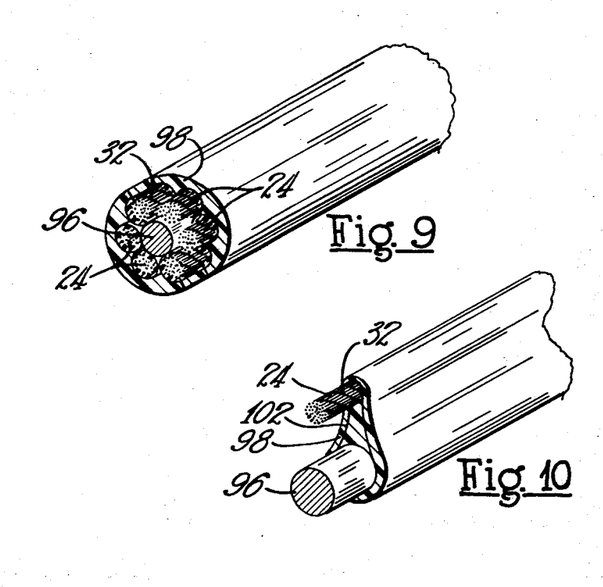

In FIGURE 9, there is shown a conductor 96, suitably made of aluminum or copper. Around the conductor 96 is an insulating covering 98 of rubber or analogous material. Embedded in the insulating covering 98 are one or more tension members 24, made in accordance with the invention.

This application is a particularly good one for supporting a long conductor in a vertical direction, as beneath the surface of the ocean. Ordinarily the weight of a long length of the conductor would break itself. The tensile members, being light, are partially floated and this increases their utility. Also, of course, vertical support above the earth's surface in the atmosphere is an analogous application for the product of FIGURE 9. By this is meant a cable dropped from an aircraft or the like.

As an analogy to the above electrical conductor, a metal wire, a carbon-containing conductor or the like might be used as a central member of the core 26 in FIGURES 3 and 4. This could be fed into the center of the core 26 in the nature of one of the strands 30 as illustrated in FIGURE 5. A very compact conductor would be provided.

In FIGURE 10, there is shown another form of conductor utilizing the present invention. The conductor 96 is embedded in a protective coating 98. Along the topside of the conductor 96 there is also embedded a tension member 24. Optionally, a support harness member 102 can be employed to cradle the conductor 96 beneath the tensile member 24. This latter expedient is used where the coating or sheath 90 is of sufficient strength.

Other uses for the products of the invention include movable members in control cables, balloon tethering cables, marine and aircraft tow cables, aircraft fending lines and underwater securing cables.

As regards FIGURES 10, 3 and 4, there may be instances where it is desired to have the tensile member also conduct current. This can be effected, at least to a degree by using a conductive matrix material in the tensile member.

Relative to the applications shown in FIGURES 9 and 10, the tensile members 24 can be coated with a lubricant to permit them to shift within the covering 98 during flexing or elongation of the covering.

A DUAL BREAK TELEMETERING APPLICATION

Within the scope of the invention, two different sets of load-supporting fibers can be provided in a single tensile member in such a manner that one will reach the break point before the other, to provide a signal.

One way to produce this effect is to provide one set of fibers in the composite mass that has a lower elongation than another set. A break signal will be produced when the break point of the first set is reached.

Also, different lengths can produce this effect. As an example, 160 strands of continuous glass fibers can be processed in accordance with the principles set forth herein, and the matrix resin only partially cured. This produces a core. Then, this core is reprocessed by adding an additional 130 strands into the composite with additional resin. As the process is repeated, different lengths are imparted to the two sets of fibers with the result that one will break before the other to give a signal.

On the second pass, of course, the helical overwrap is applied to preserve the orientation and fiber-to-fiber compaction. The entire mass is then cured.

One of the sets of strands will break first as increasing load is applied to the composite tensile member so produced. This provides a signal that a threshold loading has been reached. The tensile member remains load-bearing, however.

There are several variations of the above idea. Thus, different resins and/or glasses can be used in the first and second applied components. Also, variations in curing the first and final configurations may further alter breaking characteristics. Furthermore, a spring steel wire with a lower breaking elongation than the composite mass can be placed in the unit to form a part of a telemetering system, e.g., warn of a first-break in the composite unit.

In a further embodiment, a dual break structure can be constructed as follows. First, an overwrapped core is fabricated embodying the principles set forth above. But, the resin of this core is only partially cured. Thereafter, this unit is passed through the system again by feeding the unit into the center and placing other raw strands in covering relation around the outside as an annular sheath wherein all strands are in side-by-side relation. The raw strands are impregnated with resin and the excess is removed by means of a die. A spiral overwrap is then applied and impregnated with resin. Then this entire mass is fully cured.

When a load is applied to this composite structure, the inner spiral wrapped core reaches the break point first.

The reason is not exactly known. However, it is believed that the two passes through the system and/or manner in which the resin is cured, are effective to cause the strands of the first formed core to be extended more nearly to their maximum oriented length (without actually being under tension) than are the strands of the outside unit. Therefore, this component takes up load ahead of the outer covering unit and reaches the break point ahead of the outer structure.

FILAMENT WINDING ASPECTS

Due to the high tensile strength of the tensile members of the invention, and due to their flexibility, particularly in smaller diameters, they will find wide applications in filament winding procedures. As a general rule, based on experience to date in working with this invention, it has been found that the smaller the diameter of the composite tensile member per given number of strands used in it, the greater is the tensile strength. Inasmuch as small diameter tensile members of the invention match or exceed the tensile strengths of the highest grades of steel, and are flexible, they provide ideal filament winding materials.

While the concept of winding and "adhering" a cured epoxy tensile member as made by the invention appears unusual in terms of filament winding, their small diameter and flexibility permit close packing in a wound skin. Further, they will wet out readily and be strongly bonded to one another by a small quantity of adhesive which can be applied either before, during or after winding, by pressurizing the adhesive into the skin upon completion of the winding. The cured condition of the resin in the tensile members themselves should yield a prestressed structure which is resistant to compression and possessed of a very high modulus.

Filament winding stiff, larger, rod-like structures is also possible within the scope of the invention and should produce unusual results. Since larger diameters produce relative stiffness, winding places the outer fibers of the rods in tension and the inner fibers in compression. Such filament wound structures readily withstand internal pressures because the outer fibers are in tension to instantly assume load without movement, as is necessary in unstressed filament wound structures. These structures also withstand external pressures very well because the outer fibers are in static tension and will withstand loading to the point of fiber relaxation before the structure will buckle inwardly. Further, the inner resin is in static compression to resist the loading.

Winding by weaving lay would produce balanced forces. Thus, external fibers on the outside humps would be under tension and analogous fibers on the inside humps would also be under tension. Thus, either internal or external pressures would be instantaneously assumed by the static tension condition of the fibers. Submarine hulls and rocket casings are typical applications for the heavier, rod-like filament wound structures.

THE CABLE ASPECT

Also, woven cable constructions can be made by plying a plurality of these units together. As an example of this type of procedure, a core is prepared but only partially cured. Completely cured tensile members of the present invention are then wound around the core to form a woven cable structure. Thereafter, the entire structure is heated to finish curing the resin of the core, and this produces bonding of the core to the outer tensile members. As a variation of this aspect of the invention, both the core and the outer tensile members can be partially cured prior to cable formation; with final cure carried out thereafter.

It may also be desirable to make the core of a low-strength material so that it functions essentially as a form around which the outer helically wrapped tensile members can be placed. Thus a rod of nylon, rayon or the like, or paper tubes and the like might be used in this type of procedure. Suitable overwrap materials can be used to provide appropriate surface abrasion resistance.

Other uses for the present invention in its various forms include reinforcements for prestressed concrete, structural panel reinforcements, guy wire components, e.g., particularly for antenna masts for submarines and the like where sea water corrosion will be encountered, jointed or extensible telephone poles, cable armor and others.

VARIED DIAMETER STRANDS AND DIFFERENT MATERIALS

In a further extension of the invention, tensile members can be made using varied diameter strands. Thus, larger diameter strands can be used in one half of the core, and relatively smaller diameter strands used in the other half of the core. In another modification, strands of one diameter can be used as a sub-core and strands of another diameter used on the outside; or vice versa. In this aspect of the invention, the fibers in the strands can be of the same or different diameters.

Also, different types of glass (or equivalent material) can be used. Thus E-glass strands can be used in one portion of the core and S-glass strands can be used in another portion of the core. Further, these can be of the same or different diameters, as discussed above.

Further, one type of glass, in strand form, can be used as a sub-core and the other type of glass, in strand form, used on the outside. The fibers of these strands also can be of the same or different diameters, as discussed above.

Constructions of this type lead to the production of laminated structural materials. Thus coil and leaf springs can be made. An experimental spring made using these techniques acted much like a shock absorber.

The term line-type tensile elements as used in this specification is derived from the dictionary definition of line, e.g., a thread, string, cord or rope, esp. a comparatively slender and strong cord; as, a towline.

I claim:
1. In a composite tensile member,
   22 strands, each consisting essentially of continuous glass fibers of a diameter measured as 15,000 yards per pound, each strand having one turn per inch and containing a resin-compatible binder,
   all 22 strands being oriented to substantially the same length in static relaxed condition of the tensile member,
   said strands being compacted together adjacent to one another in parallel side-by-side relationship,
   at least one line-type tensile element spirally overwrapped along the outside of said side-by-side strands,
   and solidified epoxy resin matrix wetting all of said strands and said overwrap element and bonding all together and covering said overwrap as a thin layer,
   the composite tensile member having a density of 1.7, a diameter of .036 inch, ignition loss of 27.4% and being capable of withstanding a dead load of 284 pounds at break, 278,800 pounds per square inch for the composite, and 594,800 pounds per square inch for the glass,
   said 22 strands being held at substantially equal load-bearing orientation when said composite tensile member is placed under load, and said solidified matrix being effective to distribute the load sustained by said composite tensile member between the adjacent side-by-side strands.

2. In a composite tensile member,
   12 strands of S glass, each consisting of continuous fibers of a diameter of 15,000 yards per pound, each strand having one turn per inch and containing a resin-compatible binder,
   all 12 strands being oriented to substantially the same length in static relaxed condition of the tensile member,
   said strands being compacted together adjacent to one another in parallel side-by-side relationship,
   at least one line-type tensile element spirally overwrapped along the outside of said side-by-side strands, and solidified epoxy resin matrix wetting all of said strands and said overwrapped element and bonding all together and covering said overwrap as a thin layer,
   the composite tensile member having a weight of .41 pound per 1,000 feet, an average diameter of .028 inch, an ignition loss of 24.1%, an elongation at break of 4.35%, and being capable of withstanding a dead load of 141 pounds at break, 11.8 pounds per strand, 228,000 pounds per square inch for the composite.

3. In a composite tensile member,
   22 strands of E glass, each consisting of continuous fibers of a diameter of 15,000 yards per pound, each strand having one turn per inch and containing a resin-compatible binder,
   all 22 strands being oriented to substantially the same length in static relaxed condition of the tensile member,
   said strands being compacted together adjacent to one another in parallel side-by-side relationship,
   at least one line-type tensile element spirally overwrapped along the outside of said side-by-side strands,
   and solidified epoxy resin matrix wetting all of said strands and said overwrapped element and bonding all together and covering said overwrap as a thin layer,
   the composite ttnsile member having a weight of .067 pound per 1,000 feet, an average diameter of .036 inch, an ignition loss of 27.4% an elongation at break of 5.4% and being capable of withstanding a dead load of 176 pounds at break.

4. In apparatus for producing a composite tensile member, creel means holding a plurality of packages, each containing a continuous length of line-type tensile element, means for moving said tensile elements by a light pulling force to orient said elements to equal lengths, guide means spaced from said creel means, gathering said tensile elements into a core, tension means between said creel means and said guide means, receiving individual line-type elements from said creel means and applying substantially equal tension to each element during movement, a body of liquid, hardenable matrix, guide means guiding said core through said liquid matrix, first annular die means spaced from said liquid matrix to receive the matrix dipped core and remove excess matrix as the core passes through it, second annular die means spaced from said first die means and in alignment therewith, a package of continuous line-type tensile element, a rotatable member having an axis, a passage in said rotatable member along said axis and positioned in alignment with said die means to receive said core, means rotatably supporting said rotatable member and power means rotating said member, said package being mounted on said rotatable member to supply the element thereof as a spiral along the outside of said core between said die means, and heat-exchange means spaced from said second die means, hardening said matrix during passage of said overwrapped core in heat-exchange relation therewith.

5. The invention of claim 4 wherein said package is positioned coaxially around said rotatable member and adjacent to said second die means and feeds said element into said second die means and onto said core as the core enters said second die means.

6. The invention of claim 4 wherein said rotatable member supports a package in axial alignment and eccentrically to said axial opening of said rotatable member, a radial opening in said rotatable member exposing said core, means guiding the tensile element from said package through said radial opening onto said core, and said rotatable member being positioned between said die means.

7. In a process of producing a composite tensile member, the steps of orienting a plurality of line-type tensile elements to equal lengths to render them equally load bearing, and into adjacent side-by-side relationship as a core, dipping the oriented core into a liquid, hardenable matrix material, removing excess matrix material, heating said dipped core to reduce the viscosity of said matrix material and physically working to provide wet out of the elements by said matrix material, applying a line-type element as a spiral overwrap to the manipulated core substantially simultaneously with final shaping, to fix said orientation of said side-by-side elements, and heat-exchanging the shaped core to harden the matrix.

8. The invention of claim 7 wherein the step of applying the line-type element as a spiral overwrap to the manipulated core is effected before the final shaping.

9. The invention of claim 8 wherein the heat-exchange of the shaped core is effected substantially simultaneously with said final shaping.

10. The invention of claim 7 including the step of heat exchanging the manipulated core substantially simultaneously with the final shaping.

11. In a process of producing a composite tensile member, the steps of orienting a first set of line-type tensile elements to equal lengths to render them equally load bearing, and into adjacent, side-by-side relation, impregnating said first set with a liquid, hardenable matrix material, heat exchanging the shaped first set to at least partially harden the martix, orienting a second set of line-type tensile elements to equal lengths to render them equally load bearing, gathering the first and second sets into adjacent, side-by-side relation as a core and orienting the sets to provide different break points for the sets in the composite tensile member, coating the gathered core with a hardenable matrix material and removing excess, manipulating the coated core to provide wet out of the elements by said matrix, providing final cross-sectional shape to the wetted core, and heat exchanging the shaped core to harden the matrix.

12. The process of claim 11 including the step of applying a line-type tensile element as a spiral overwrap to the manipulated core before the final shaping, to fix said orientation of said side-by-side elements.

13. The invention of claim 12 including the step of orienting the sets to different lengths in the composite tensile member to provide different break points.

14. The invention of claim 11 wherein the first and second sets have different elongations.

References Cited

UNITED STATES PATENTS

| | | | |
|---|---|---|---|
| 2,714,623 | 8/1955 | Wolcott | 174—124.1 |
| 3,024,302 | 3/1962 | Coggeshall | 156—160 |
| 3,273,987 | 9/1966 | Marzocchi et al. | 57—157 |

ROBERT F. BURNETT, Primary Examiner

J. D. FOSTER, Assistant Examiner

U.S. Cl. X.R.

57—18, 140, 149 153, 162; 117—126; 156—161, 172, 428; 161—176; 174—110